(12) United States Patent
Sorin

(10) Patent No.: US 7,305,339 B2
(45) Date of Patent: Dec. 4, 2007

(54) RESTORATION OF HIGH-ORDER MEL FREQUENCY CEPSTRAL COEFFICIENTS

(75) Inventor: Alexander Sorin, Haifa (IL)

(73) Assignee: International Business Machines Corporation, Armonk, NY (US)

(*) Notice: Subject to any disclaimer, the term of this patent is extended or adjusted under 35 U.S.C. 154(b) by 952 days.

(21) Appl. No.: 10/405,733

(22) Filed: Apr. 1, 2003

(65) Prior Publication Data

US 2004/0199381 A1 Oct. 7, 2004

(51) Int. Cl.
*G10L 15/00* (2006.01)
(52) U.S. Cl. .................................. 704/250; 704/256
(58) Field of Classification Search ................ 704/250, 704/256
See application file for complete search history.

(56) References Cited

U.S. PATENT DOCUMENTS

| | | | |
|---|---|---|---|
| 5,732,188 A * | 3/1998 | Moriya et al. | 704/219 |
| 2002/0147579 A1* | 10/2002 | Kushner et al. | 704/207 |
| 2003/0144839 A1* | 7/2003 | Dharanipragada et al. | 704/246 |
| 2004/0138888 A1* | 7/2004 | Ramabadran | 704/262 |

* cited by examiner

*Primary Examiner*—Daniel Abebe

(57) ABSTRACT

A method for estimating high-order Mel Frequency Cepstral Coefficients, the method comprising initializing any of N–L high-order coefficients (HOC) of an MFCC vector of length N having L low-order coefficients (LOC) to a predetermined value, thereby forming a candidate MFCC vector, synthesizing a speech signal frame from the candidate MFCC vector and a pitch value, and computing an N-dimensional MFCC vector from the synthesized frame, thereby producing an output MFCC vector.

19 Claims, 5 Drawing Sheets

RESTORATION OF HIGH-ORDER MEL FREQUENCY CEPSTRAL COEFFICIENTS

FIELD OF THE INVENTION

The present invention relates to Automatic Speech Recognition (ASR) in general, and more particularly to ASR employing Mel Frequency Cepstral Coefficients (MFCC).

BACKGROUND OF THE INVENTION

Automatic Speech Recognition (ASR) systems that convert speech to text typically comprise two main processing stages, often referred to as the "front-end" and the "back-end." The front-end typically converts digitized speech into a set of features that represent the speech content of the spectrum of the speech signal, usually sampled at regular intervals. The features are then converted to text at the back-end.

During feature extraction the speech signal is typically divided into overlapping frames, with each frame having a predefined duration. A feature vector, typically having a predefined number of features, is then calculated for each frame. In most ASR systems a feature vector is obtained by:
a) deriving an estimate of the spectral envelope corresponding to the frame;
b) multiplying the estimate of the spectral envelope by a predetermined set of frequency domain weighting functions, where each weighting function is non-zero over a narrow range of frequencies, known as the frequency channel, and computing the integrals thereof, known as bins, to form a binned spectrum; and
c) assigning the computed integrals or a set of predetermined functions thereof to respective components of the feature vector.

Many ASR systems employ speech recognition features know as Mel Frequency Cepstral Coefficients (MFCC) that are obtained by employing specific frequency domain weighting functions at step b) and computing a cosine transform of the logarithm of the binned spectrum at step c). Typically, the spectral envelope estimate at step a) is represented by the Amplitude Short Time Spectrum (ASTS) or Power Short Time Spectrum (PSTS) of the frame. The ASTS and PSTS are obtained as absolute values and squared absolute values respectively of the Short Time Fourier Transform (STFT) applied to the frame, where the frame is multiplied by a smooth windowing function, such as a Hamming window, and then transformed using the Discrete Fourier Transform (DFT). The frequency channels used in step b) typically overlap, and a frequency channel with a higher channel number has a greater width than a frequency channel with a lower channel number. A Mel transform function $Mel(f)$ of the frequency axis may be used to define the frequency channel, where $Mel(f)$ is a convex non-linear function off whose derivative increases rapidly with $f$. A typical example is $Mel(f)=2595*\log_{10}(1+f/700)$, where $f$ is a frequency in Hz. A set of equidistant points $mf_i$, $i=0, \ldots, N+1$, are defined at the mel-frequency interval $[Mel(f_{start}), Mel(f_{Nyquist})]$ as follows:

$$mf_i = Mel(f_{start}) + i \times \frac{Mel(f_{Nyquist}) - Mel(f_{start})}{N+1}$$

where $f_{start}$ is a starting point of the frequency analysis interval, such as 64 Hz, and $f_{Nyquist}$ is the Nyquist frequency of the speech signal. The frequency channel used to generate the $i^{th}$ bin value is $[f(i-1), f(i+1)]$, where $i=1, 2, \ldots, N$, and $f_i$ are given by the inverse Mel transform $f_i=Mel^{-1}(mf_i)$. The corresponding frequency weighting function, called a Mel filter, is defined to be a hat function having two segments that are linear in Mel frequency. The first segment ascends from $f(i-1)$ to $f(i)$, while the second segment descends from $f(i)$ to $f(i+1)$. The weighting functions are sampled at DFT points. The value of the $i^{th}$ bin is obtained by multiplying the $i^{th}$ weighting function by the values of discretely sampled estimate of the spectral envelope, and summing the result. This process is called Mel filtering. The resulting components partition the spectrum into frequency bins that group together the spectral components within the channel through weighted summation. To obtain the Mel Cepstrum, the bins are increased if necessary to be always larger than some small number such as $b^{-50}$, where b is the base of the logarithm operation, i.e. 10 or e, and the log of the result is taken. The DCT of the sequence of logs is then computed, and the first L transform coefficients, where $(L \leq N)$, are assigned to corresponding coordinates of the MFCC vector $\{C_0, C_1, C_2, \ldots, C_{L-1}\}$ which is used by the ASR back-end.

While various MFCC front-end schemes might employ different spectral envelope estimation techniques, Mel function definitions, numbers N of frequency channels, etc., the maximal dimension N of an MFCC vector is equal to the number of frequency domain weighting functions or the number of bin values. The starting coordinates of the MFCC vector, referred to as low-order cepstra (LOC), generally reflect the global shape of the spectral envelope, while the ending coordinates, referred to as high-order cepstra (HOC), typically have relatively small values, and generally reflect the rapidly-varying-in-frequency nature of the spectrum. It has been observed that in small vocabulary recognition tasks the recognition accuracy is virtually unaffected when $L \approx N/2$, i.e., when the MFCC vector is truncated by 50%.

In some ASR systems, the recording of a speech signal and the subsequent speech recognition are performed by processors at separate locations, such as where a speech signal is recorded at a client device, such as a cell phone, and processed at an ASR server. Audio information that is captured at a client device is often transmitted to a server over a communications channel. Typically, and especially where the client and server communicate via a wireless network, it is not feasible to transmit the entire speech signal due to communications channel bandwidth limitations. Therefore, the speech signal is typically compressed. However, it is imperative that the compression scheme used to compress the speech will not significantly reduce the recognition rate at the server. Thus, in some systems a compressed version of the recognition features themselves is transmitted to the server. Since redundant information has been already removed in generating these features, an optimal compression rate can be attained.

In one such implementation of recording and performing speech recognition at different locations, known as Distributed Speech Recognition (DSR), a client device performs front-end speech processing where features, are extracted, compressed, and transmitted via a communications channel to a server, which then performs back-end speech processing including speech-to-text conversion. In order to conserve bandwidth, MFCC vectors are often truncated in DSR systems prior to transmission. For example, the ETSI DSR standards ES 201 108 (April 2000) and ES 202 050 (July 2002) define two different front-end feature extraction and compression algorithms employing MFCC vectors where only 13 cepstra (L=13) out of 23 (N=23) are transmitted to the server for ASR back-end processing.

In some DSR systems, speech reconstruction and playback capabilities are required at the server. Where pitch is derived for each frame during speech processing, various techniques may be used to synthesize a speech signal using MFCC vectors and pitch. Unfortunately, while truncated MFCC vectors are suitable for speech recognition, speech reconstruction quality suffers significantly where truncated MFCC vectors are employed. Truncated MFCC vectors reduce the accuracy of spectra estimation, resulting in reconstructed speech having a "mechanical" sound quality. Therefore, a method for restoring high-order Mel frequency cepstral coefficients of truncated MFCC vectors would be advantageous.

SUMMARY OF THE INVENTION

The present invention provides for estimating HOC in an MFCC vector for voiced speech frames from the available LOC and pitch. The estimated HOC of the present invention improves both speech reconstruction quality and speech recognition accuracy when compared with speech reconstruction and recognition using truncated MFCC vectors.

In one aspect of the present invention a method is provided for estimating high-order Mel Frequency Cepstral Coefficients, the method including a) in an MFCC vector of length N having L low-order coefficients (LOC), initializing any of N−L high-order coefficients (HOC) of the MFCC vector to a predetermined value, thereby forming a candidate MFCC vector, b) synthesizing a speech signal frame from the candidate MFCC vector and a pitch value, and c) computing an N-dimensional MFCC vector from the synthesized frame, thereby producing an output MFCC vector.

In another aspect of the present invention the method further includes performing the steps b)-c) up to a predetermined number of additional iterations, where the HOC of the output MFCC vector of a given iteration is appended to the LOC to form a new candidate MFCC vector for the next iteration.

In another aspect of the present invention the initializing step includes initializing where the predetermined value is zero.

In another aspect of the present invention the synthesizing step includes synthesizing from the candidate MFCC vector and the pitch value that are derived from the same speech signal.

In another aspect of the present invention the synthesizing step includes synthesizing using a harmonic model of voiced speech for parametric representation of the speech frame, and the method further includes estimating for each of a plurality of iterations of steps b)-c) any of the parameters of the model from the candidate MFCC vector and the pitch value for the iteration.

In another aspect of the present invention the computing step includes calculating using a harmonic model of voiced speech for parametric representation of the speech frame, where at each of a plurality of iterations of steps b)-c) the output MFCC vector is computed from the harmonic model parameters estimated at that iteration.

In another aspect of the present invention a method is provided for estimating high-order Mel Frequency Cepstral Coefficients, the method including a) converting a truncated L-dimensional MFCC vector of low-order coefficients (LOC) to an N-dimensional binned spectrum, b) initializing N−L high-order coefficients (HOC) using predetermined values, c) computing an N-dimensional binned spectrum corresponding to the HOC, d) calculating a composite binned spectrum from both of the binned spectra using coordinate-wise multiplication, e) estimating at least one harmonic model parameter from the composite binned spectrum and a pitch frequency, thereby producing a basis bins matrix and basis function mixing coefficients, f) synthesizing a new binned spectrum by multiplying the basis bins matrix by the vector of the basis function mixing coefficients, g) regularizing the synthesized bins, and h) converting the regularized synthesized bins to HOC, thereby estimating the HOC.

In another aspect of the present invention the converting step a) includes converting using an N-dimensional Inverse Discrete Cosine Transform (IDCT) followed by an antilog operation.

In another aspect of the present invention the converting step a) includes appending to the truncated MFCC vector an N−L-dimensional vector of zero-valued coordinates.

In another aspect of the present invention the initializing step b) includes initializing using zero values, and each coordinate of the binned spectrum vector corresponding to the HOC is set equal to 1.

In another aspect of the present invention the initializing step b) includes preparing a set of HOC vectors, where each vector corresponds to a predetermined range of pitch values, determining the range into which a provided pitch value fits, selecting from among the HOC vectors a vector that corresponds to the range, and initializing the HOC with the selected vector.

In another aspect of the present invention the computing step c) includes logically preceding the initialized HOC vector by N−L zeros.

In another aspect of the present invention the estimating step e) includes modeling at least one harmonic amplitude $A_k$ as a linear combination of N basis functions $\{BF_i\}$ sampled at a plurality of pitch frequency multiples $$\text{as } A_k = \sum_{i=1}^{N} b_i \cdot BF_i(kF_p).$$

In another aspect of the present invention the method further includes performing a transformation $\sqrt{B_i \cdot S_i}$ of each coordinate $B_i$ of the composite binned spectrum, where $S_i$ is a sum of the values of the $i^{th}$ Mel-filter, where the input LOC was produced using a Power Short Time Spectrum.

In another aspect of the present invention the regularizing step g) includes identifying any coordinates of the synthetic vector whose value does not exceed a predefined threshold, and setting any of the identified coordinates equal to a regularization value $R=a \cdot B_{av}$, where $B_{av}$ is an average of the coordinate values of the synthetic vector and a is predefined value.

In another aspect of the present invention the converting step h) includes applying a logarithm to synthetic vector, and performing a Discrete Cosine Transform on the synthetic vector.

In another aspect of the present invention the method further includes i) computing a new binned spectrum corresponding to the HOC vector, and j) performing steps d)-h) using the new binned spectrum corresponding to the HOC vector.

In another aspect of the present invention the method further includes performing steps i)-j) a plurality of times until a predefined number of iterations is reached, and if the predefined number of iterations has been reached, concatenating the estimated HOC with the LOC.

In another aspect of the present invention the estimating step e) includes sampling a plurality of basis functions at a plurality of pitch frequency multiples, calculating a spectral envelope for each sampled basis function by convolution with a Fourier transform of a windowing function, applying Mel filters to each of the spectral envelopes, resulting in an N-dimensional basis bins vector $BB_i$, composing an N by N basis bins matrix BB having the basis bins vectors $BB_i$ as its columns, computing an equation matrix Q as $Q=BB^T*BB+\epsilon*I$ where I is a unit matrix and $\epsilon$ is a regularization factor, applying LU-decomposition to the equation matrix Q, computing an equation right side vector V as $V=BB^T*B$, where B is a column vector of bin value inputs to harmonic model parameter estimation, and solving a matrix equation $Q*b=V$ in b using the LU representation of the equation matrix Q.

In another aspect of the present invention the computing an equation matrix step includes computing the regularization factor as 0.001 multiplied by the average of the $BB^T*BB$ matrix elements residing at the main diagonal.

In another aspect of the present invention High-order Mel Frequency Cepstral Coefficient estimation apparatus is provided including means for forming a candidate MFCC vector from an MFCC vector of length N having L low-order coefficients (LOC), operative to initialize any of N–L high-order coefficients (HOC) of the MFCC vector to a predetermined value, a synthesizer operative to synthesize a speech signal frame from the candidate MFCC vector and a pitch value, and means for computing an N-dimensional MFCC vector from the synthesized frame, operative to produce an output MFCC vector.

In another aspect of the present invention a Distributed Speech Recognition system is provided employing MFCC vector HOC estimation, the system including speech recognition front-end apparatus operative to extract from each frame of an input speech signal a LOC, a pitch value, and a voicing class, HOC restoration apparatus operative to form a candidate MFCC vector from the LOC and a plurality of HOC, synthesize a speech signal frame from the candidate MFCC vector and the pitch value, and apply speech recognition front-end processing to the synthesized frame, thereby producing an output MFCC vector, speech recognition backend apparatus operative to produce text from a plurality of the output MFCC vectors, and speech reconstruction apparatus operative to synthesize speech from plurality of the output MFCC vectors, the pitch values, and the voicing class values.

In another aspect of the present invention the HOC restoration apparatus is additionally operative to sample basis functions at a plurality of pitch frequencies and compute a plurality of mixing coefficients, the system further includes harmonic amplitudes modeling apparatus operative to calculate harmonic amplitudes from the basis functions and mixing coefficients, and the speech reconstruction apparatus is operative to synthesize the speech from a plurality of the output MFCC vectors, the pitch values, the voicing class values, and the harmonic amplitudes.

In another aspect of the present invention the HOC restoration apparatus is operative to perform the forming, synthesizing, and performing up to a predetermined number of additional iterations, where the HOC of the output MFCC vector of a given iteration is appended to the LOC to form a new candidate MFCC vector for the next iteration.

In another aspect of the present invention there is provided a computer program embodied on a computer-readable medium, the computer program including a first code segment operative to initialize any of N–L high-order coefficients (HOC) of an MFCC vector of length N having L low-order coefficients (LOC), thereby forming a candidate MFCC vector, a second code segment operative to synthesize a speech signal frame from the candidate MFCC vector and a pitch value, and a third code segment operative to compute an N-dimensional MFCC vector from the synthesized frame, thereby producing an output MFCC vector.

In another aspect of the present invention there is provided a computer program embodied on a computer-readable medium, the computer program including a first code segment operative to convert a truncated L-dimensional MFCC vector of low-order coefficients (LOC) to an N-dimensional binned spectrum, a second code segment operative to initialize N–L high-order coefficients (HOC) using predetermined values, a third code segment operative to compute an N-dimensional binned spectrum corresponding to the HOC, a fourth code segment operative to calculate a composite binned spectrum from both of the binned spectra using coordinate-wise multiplication, a fifth code segment operative to estimate at least one harmonic model parameter from the composite binned spectrum and a pitch frequency, thereby producing a basis bins matrix and basis function mixing coefficients, a sixth code segment operative to synthesize a new binned spectrum by multiplying the basis bins matrix by the vector of the basis function mixing coefficients, a seventh code segment operative to regularize the synthesized bins, and a eighth code segment operative to convert the regularized synthesized bins to HOC, thereby estimating the HOC.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
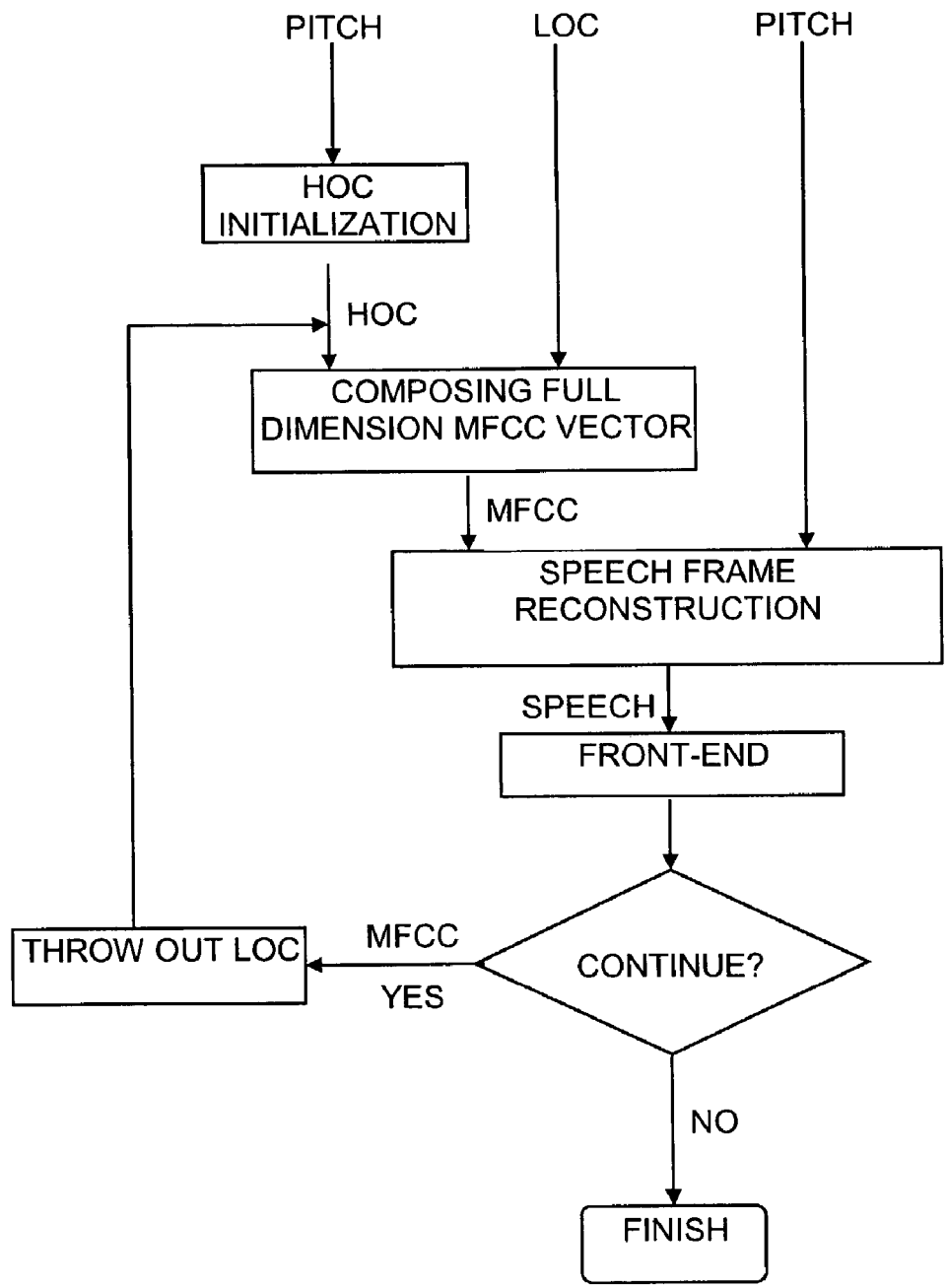
FIG. 1 is a simplified high-level flowchart illustration of a method of MFCC vector HOC restoration, operative in accordance with a preferred embodiment of the present invention.

Reference is now made to FIG. 1, which is a simplified high-level flowchart illustration of a method of MFCC vector HOC restoration, operative in accordance with a preferred embodiment of the present invention. The method of FIG. 1 is typically performed iteratively, alternating between performing speech reconstruction from an MFCC vector and a pitch value, and applying front-end speech processing to the reconstructed speech signal.

In the method of FIG. 1, given an MFCC vector having L low-order coefficients (LOC), a predetermined number N−L of high-order coefficients (HOC) are initialized to predetermined values, such as zeros. A preferred method of HOC initialization is described in greater detail hereinbelow with reference to FIG. 2. The N−L HOC when appended to the L LOC form a complete N-dimensional MFCC vector, now referred to as the candidate MFCC vector. A speech signal frame is then synthesized from the candidate MFCC vector and a pitch value using any suitable speech reconstruction technique, such as that which is described in the U.S. patent application Ser. No. 09/432,081 to Chazan et al. entitled "Method and system for speech reconstruction from speech recognition features." Both the MFCC vector LOC and the pitch value are preferably derived from the same speech signal using conventional techniques. The synthesized frame is then input into a conventional speech recognition engine, such as a DSR front-end, and a new MFCC vector, now referred to as the output MFCC vector, is produced corresponding to the synthesized frame. The method of FIG. 1 may be performed one or more additional times, such as up to a predetermined number of iterations (e.g., 3), where the HOC of the output MFCC vector of a given iteration is appended to the given LOC to form a new candidate MFCC vector for the next iteration.

A harmonic or line spectrum model of voiced speech is preferably used during speech reconstruction for parametric representation of the speech frame. At each iteration the model parameters are preferably estimated from the corresponding candidate MFCC vector and input pitch value such that the output MFCC vector that is subsequently produced from the synthesized frame by the front-end processor approximates the candidate MFCC vector as closely as possible with respect to certain metrics as described in greater detail hereinbelow.

It is well known that a speech signal within a relatively short frame can be accurately approximated by a periodic signal. The period duration as measured in samples is given by a pitch or its inverse, referred to as a normalized pitch frequency $F_p$. The Fourier spectrum of an infinite periodic signal is a train of impulses (i.e., harmonics, lines) located at multiples of the pitch frequency. This spectrum is referred to as a line spectrum. Each harmonic has its amplitude and phase values. It can be shown that a binned spectrum $B_{ASTS}$ is virtually independent from the harmonic phases and is approximately linear in harmonic amplitudes, where ASTS is used at the front-end, such that:

$$[B_1 B_2 \ldots B_K] * P = B_{ASTS} \qquad \text{EQ. 1}$$

In EQ. 1 the matrix $[B_1 B_2 \ldots B_K]$ is populated by column vectors $B_i$, where $K=0.5/F_p$ is the number of harmonics and $B_i$ is a binned vector contributed by the $i^{th}$ harmonic with a unit amplitude. The coordinates of vector P are harmonic amplitudes. EQ. 1 can be viewed as an equation for determining harmonic amplitudes. In practice, the matrix equation might not have an exact solution and may be solved in the least square sense. The number of harmonics might exceed the number of the equations/bin values. Thus, additional constraints may be imposed on the harmonic magnitudes in order to guarantee a single solution.

If PSTS is used at the front-end, the binned spectrum $B_{PSTS}$ may be transformed so that it approximates the binned spectrum $B_{ASTS}$, which would be obtained for the frame by using ASTS. Once $B_{PSTS}$ to $B_{ASTS}$ transformation is done, EQ. 1 and ASTS processing may be performed without modification. A preferred method for $B_{PSTS}$ to $B_{ASTS}$ transformation is described in greater detail hereinbelow.

The reconstructed speech frame obtained at the end of each iteration may be further improved in terms of perceptual quality using conventional techniques, such as by synthesizing harmonic phase values and adding an unvoiced component, and then combined with other such frames in order to produce a speech signal for playback. Thus, the method of FIG. 1 may be implemented as an intermediate step of known speech reconstruction techniques that reconstruct speech from MFCC vectors and pitch values.

Figure 2:
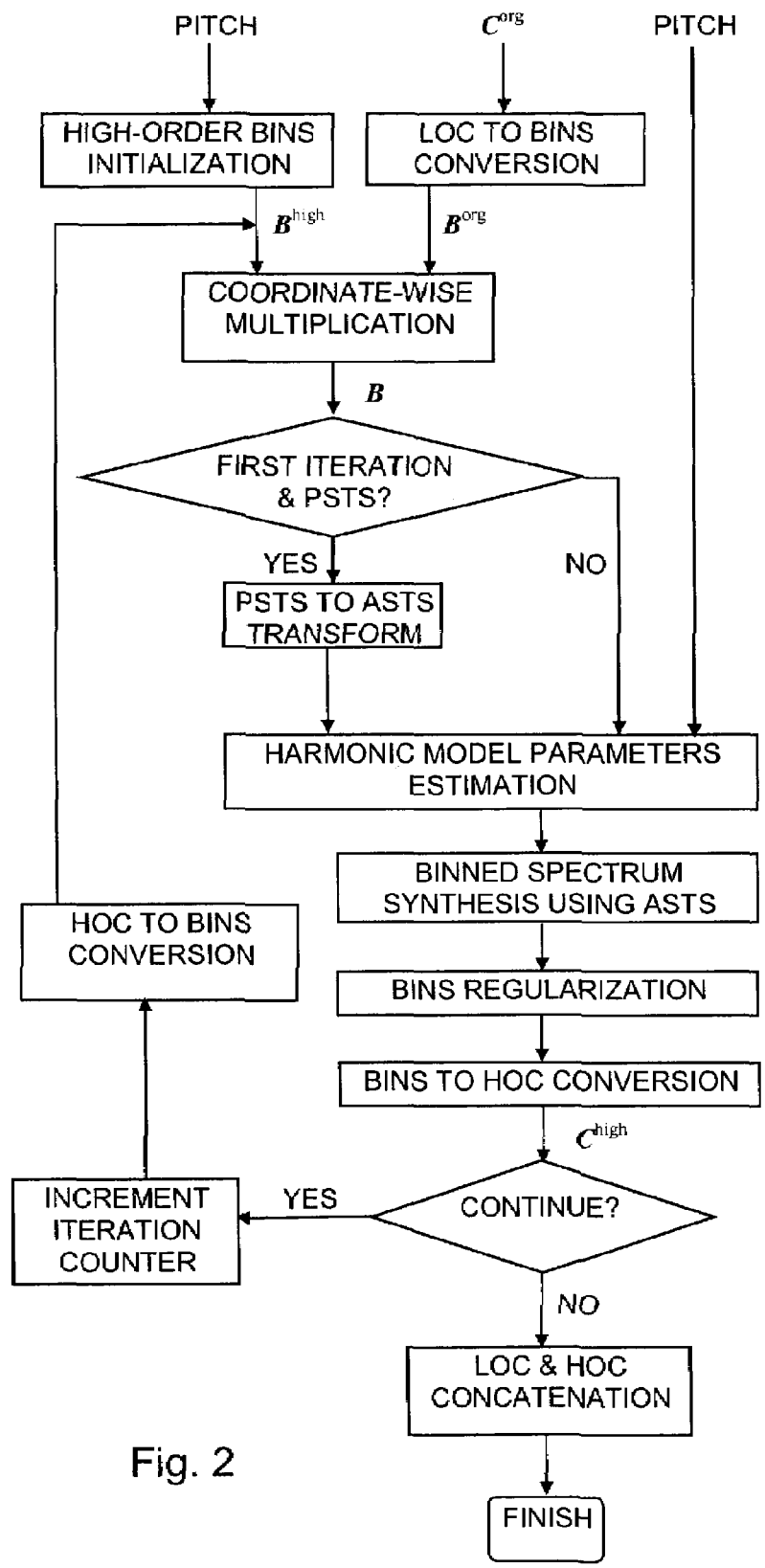
FIG. 2 is a simplified flowchart illustration of a method of MFCC vector HOC restoration, operative in accordance with a preferred embodiment of the present invention.

Reference is now made to FIG. 2, which is a simplified flowchart illustration of a method of MFCC vector HOC restoration, operative in accordance with a preferred embodiment of the present invention. The method of FIG. 2 is similar to the method of FIG. 1, and differs in that the LOC-HOC concatenation is implemented by multiplying their corresponding binned spectra, and that the speech reconstruction step is terminated after the harmonic model parameters are estimated. The parametric representation of the frame is used directly for the calculation of the output MFCC vector.

In the method of FIG. 2 a truncated L-dimensional MFCC vector $C^{org}=\{C_0, C_1, C_2, \ldots, C_{L-1}\}$ containing LOC only, and a pitch frequency value $F_p$ are input. An iteration counter variable is preferably set to 1. The MFCC vector then is converted to an N-dimensional binned spectrum $B^{org}$. The conversion is preferably performed using an N-dimensional Inverse Discrete Cosine Transform (IDCT) followed by an antilog operation. In performing the N-dimensional IDCT of the L-dimensional vector $C^{org}$, a conventional IDCT may be applied to the original MFCC vector after appending it to an N−L-dimensional vector (N−L="N minus L")

$$O = \left\{ \begin{matrix} 0_{123} 0 \\ N-L \end{matrix} \right\}$$

of zero-valued coordinates as follows:

$$B^{org} = \text{antilog}(\text{IDCT}([C^{org} O])) \qquad \text{EQ. 2}$$

The N−L HOC are then initialized using predetermined values $C^{high}=\{\sigma_L, \sigma_{L+1}, \sigma_{L-2}, \ldots, \sigma_{N-1}\}$, and a binned spectrum corresponding to the HOC is then computed. The calculation is analogous to the one performed for the LOC using EQ. 2, with the exception that the vector $C^{high}$ is logically preceded by N−L zeros as follows:

$$B^{high} = \text{antilog}(\text{IDCT}([O\ C^{high}])) \qquad \text{EQ. 3}$$

In one preferred embodiment, the HOC are initialized using zero values ($\sigma_i=0$), and each coordinate of the initial $B^{high}$ vector is set equal to 1.

In another preferred embodiment, a set of HOC vectors is prepared, where each vector corresponds to a predetermined range of pitch values, such as is described in U.S. patent application Ser. No. 10/341,726, entitled "Method and Apparatus for Speech Reconstruction Within a Distributed Speech Recognition System." One of the vectors is then chosen based upon the pitch value, such as by determining the range into which the pitch fits and choosing the vector that corresponds to the range, and is used to initialize the $C^{high}$ vector.

A composite binned spectrum B is then calculated from both binned spectra using coordinate-wise multiplication as follows:

$$B = \{B_1^{org} \cdot B_1^{high}, B_2^{org} \cdot B_2^{high}, \ldots, B_N^{org} \cdot B_N^{high}\} \qquad \text{EQ. 4}$$

It may be seen that the composite binned spectrum corresponds to the concatenation of the original LOC vector $C^{org}$ and the HOC vector $C^{high}$ as given by the formula B=antilog (IDCT([$C^{org}$ $C^{high}$])).

If the input LOC $C^{org}$ was produced by a front-end using PSTS, and the iteration counter indicates that the first iteration is being performed, then the composite binned spectrum B preferably undergoes a coordinate-wise PSTS to ASTS transformation given by the formula:

$$B_i \leftarrow \sqrt{B_i \cdot S_i},$$

where $S_i$ is a sum of the $i^{th}$ Mel-filter values.

Harmonic model parameters of a speech signal are then estimated from the binned spectrum B and pitch frequency $F_p$. In a preferred embodiment harmonic amplitudes $\{A_k\}$ are modeled as a linear combination of N basis functions $\{BF_i\}$ sampled at the pitch frequency multiples, such as is described in U.S. patent application Ser. No. 09/432,081 where the following formula is used:

$$A_k = \sum_{i=1}^{N} b_i \cdot BF_i(kF_p). \qquad \text{EQ. 5}$$

The $i^{th}$ basis function $BF_i$ has a finite support specified by the $i^{th}$ frequency channel used by the front-end and is defined as:

$$BF_i(f) = 0.4 \cdot M_i(f) + 0.6 \cdot M_i(f)^2 \qquad \text{EQ. 6}$$

where $M_i$ is the $i^{th}$ Mel filter, and $f$ is a frequency argument.

Figure 3:
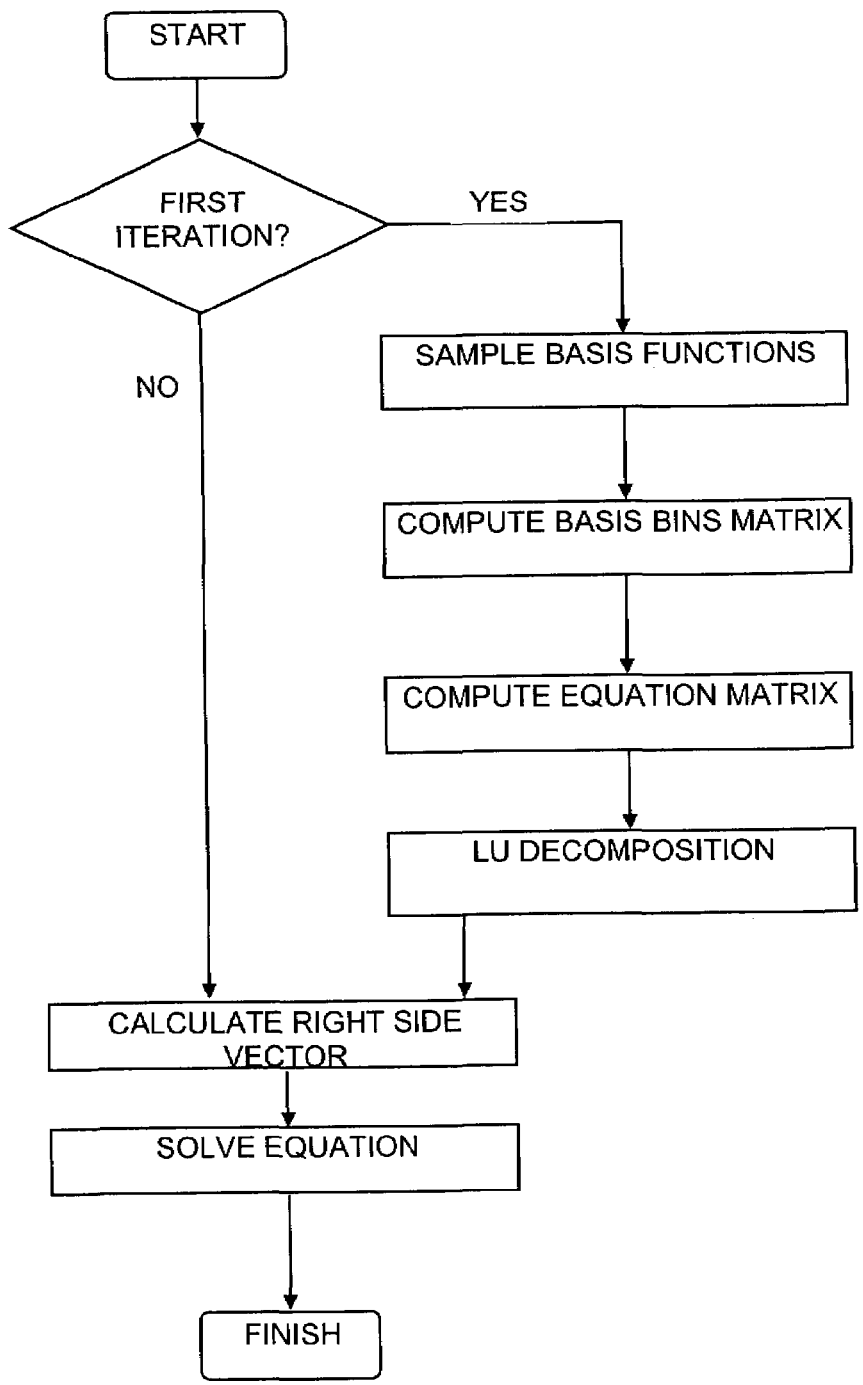
FIG. 3 is a simplified flowchart illustration of a method of harmonic model parameters estimation in support of MFCC vector HOC restoration, operative in accordance with a preferred embodiment of the present invention.

Harmonic model parameters that serve as the basis functions mixing coefficients $b = \{b_i\}$ are then estimated from the composite binned spectrum B and the normalized pitch frequency value $F_p$, such as by the method shown in FIG. 3, to which additional reference is now made. With each iteration of the method of FIG. 2 a new bins vector is typically used for harmonic model parameter estimation, while the pitch frequency value, and any other value whose calculation does not depend on the composite binned spectrum B, is typically unchanged between iterations and may be preserved between iterations. Thus, if the iteration counter indicates that the first iteration is being performed, the basis functions are sampled at the pitch frequency multiples as follows:

$$BF_i(kF_p) = 0.4 \cdot M_i(kF_p) + 0.6 \cdot M_i(kF_p)^2 \qquad \text{EQ. 7}$$

where $i=1, \ldots, N$, $k=1, \ldots, K$, and K is the number of harmonics $K=0.5/F_p$. A spectral envelope is then calculated for each sampled basis function by convolution with the Fourier transform of the windowing function used at the front-end, taking an absolute value, as follows:

$$SB_i(j) = \left| \sum_{k=1}^{K} BF_i(kF_p) \cdot W(f_j - 2\pi k F_p) \right| \qquad \text{Eq. 8}$$

where j is a DFT point index, $f_j$ is a frequency corresponding to the $j^{th}$ DFT point.

Mel filters are applied to each spectral envelope, resulting in an N-dimensional bins vector $BB_i$, now referred to as a basis bins vector. An N by N basis bins matrix $BB_i$, is then composed with the basis bins vectors $BB_i$ as its columns as follows:

$$BB = [BB_1\ BB_2\ \ldots\ BB_N] \qquad \text{EQ. 9}$$

An equation matrix Q is then computed as:

$$Q = BB^T * BB + \epsilon * I \qquad \text{EQ. 10}$$

where I is a unit matrix, and $\epsilon$ is a regularization factor. In a preferred embodiment the regularization factor is computed as 0.001 multiplied by the average of the $BB^T*BB$ matrix elements residing at the main diagonal. LU-decomposition is then applied to the equation matrix Q.

If the iteration counter indicates that the first iteration has already been performed, the results of equations 7-10 from the first iteration may be used, and equations 7-10 need not be calculated for each subsequent iteration.

Equation right side vector V is then computed in accordance with the formula:

$$V = BB^T * B \qquad \text{EQ. 11}$$

where B is a column vector of bin value inputs to harmonic model parameter estimation. The matrix equation:

$$Q * b = V \qquad \text{EQ. 12}$$

is then solved in b using the LU representation of the matrix Q.

Returning now to FIG. 2, a new binned spectrum $B^{synt} = \{B_1^{synt}, B_2^{synt}, \ldots, B_N^{synt}\}$ is synthesized after harmonic model parameter estimation by multiplying the basis bins matrix by the vector of the basis function mixing coefficients:

$$B^{synt} = BB * b \qquad \text{EQ. 13}$$

Regularization of the bins is then performed where small coordinates of the $B^{synt}$ vector are detected and modified in order to assure that the logarithm operations applied to the coordinates of the vector is well defined. In a preferred embodiment, a regularization term $R = a \cdot B_{av}$ is calculated, where $B_{av}$ is an average of the bin values and a is a predefined parameter, such as 0.005. Each bin value that is less than or equal to a predefined threshold T, such as 0, is set equal to R. All the bin values which are greater then T preferably remain unchanged.

Bins-to-HOC conversion is then performed by applying a logarithm followed by DCT to the synthetic binned spectrum $B^{synt}$ in order to calculate an MFCC vector. Typically, only N-L HOC $C^{high} = \{C_L, C_{L+1}, C_{L+2}, \ldots, C_{N-1}\}$ are calculated. The HOC of the input MFCC vector to the current iteration are then replaced with the currently calculated HOC.

The iteration counter is then compared to a predefined value to determine whether additional iterations are to be performed. In a preferred embodiment three iterations are made. If the counter value has reached the predefined number of iterations, then the estimated HOC given by vector $C^{high}$ are concatenated with the original LOC given by vector $C^{org}$. The resulting MFCC vector $C^{fix} = [C^{org}\ C^{high}]$ may be used in speech reconstruction and/or by an ASR back-end. Additionally or alternatively, harmonic amplitudes may be calculated in accordance with EQ. 5 using the vector b obtained at the last iteration. These harmonic amplitudes may also be used for speech signal reconstruction in accordance with conventional techniques.

If the iteration counter has not reached the predefined number of iterations, the counter is incremented, and a new $B^{high}$ binned spectrum corresponding to the HOC vector $C^{high}$ is calculated in accordance with EQ. 3. This vector is then processed during the next iteration.

Figure 4:
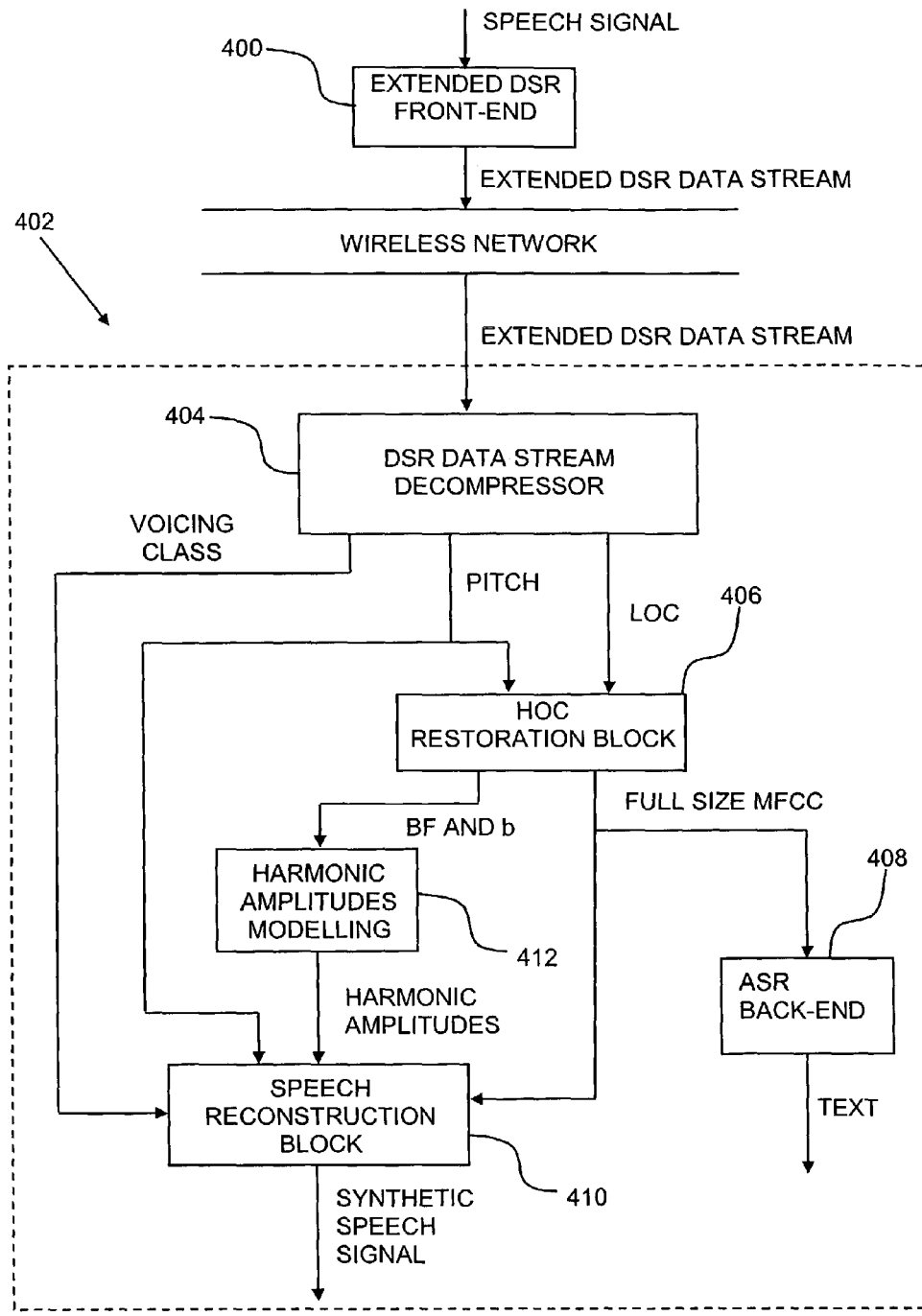
FIG. 4 is a simplified block-flow diagram of a Distributed Speech Recognition system employing MFCC vector HOC estimation, constructed and operative in accordance with a preferred embodiment of the present invention.

Reference is now made to FIG. 4, which is a simplified block-flow diagram of a Distributed Speech Recognition system employing MFCC vector HOC estimation, constructed and operative in accordance with a preferred embodiment of the present invention. In FIG. 4 an extended DSR front-end 400 extracts from each frame of an input speech signal a LOC, a pitch value, and typically other parameters such as voicing class, compresses this information, and transmits the compressed data to a server 402, such as over a wireless communications channel. At the server side the data stream is decompressed at a decompressor 404. The LOC and pitch are passed to a HOC restoration block 406 that operates in accordance with the methods described hereinabove with reference to FIGS. 1-3. HOC restoration block 406 produces full-size MFCC vectors that are sent to an ASR back-end 408 which completes the speech recognition process and outputs text. In parallel, the full size MFCC vectors together with the pitch values and the voicing class information are passed to a speech reconstruction block 410. Additionally, HOC restoration block 406 preferably passes the basis functions sampled at pitch frequencies and the mixing coefficients to a harmonic amplitudes modeling block 412 where the harmonic amplitudes are calculated in accordance with EQ. 5. The harmonic amplitudes are also preferably passed to speech reconstruction block 410 which outputs a synthesized speech signal for playback.

Figure 5:
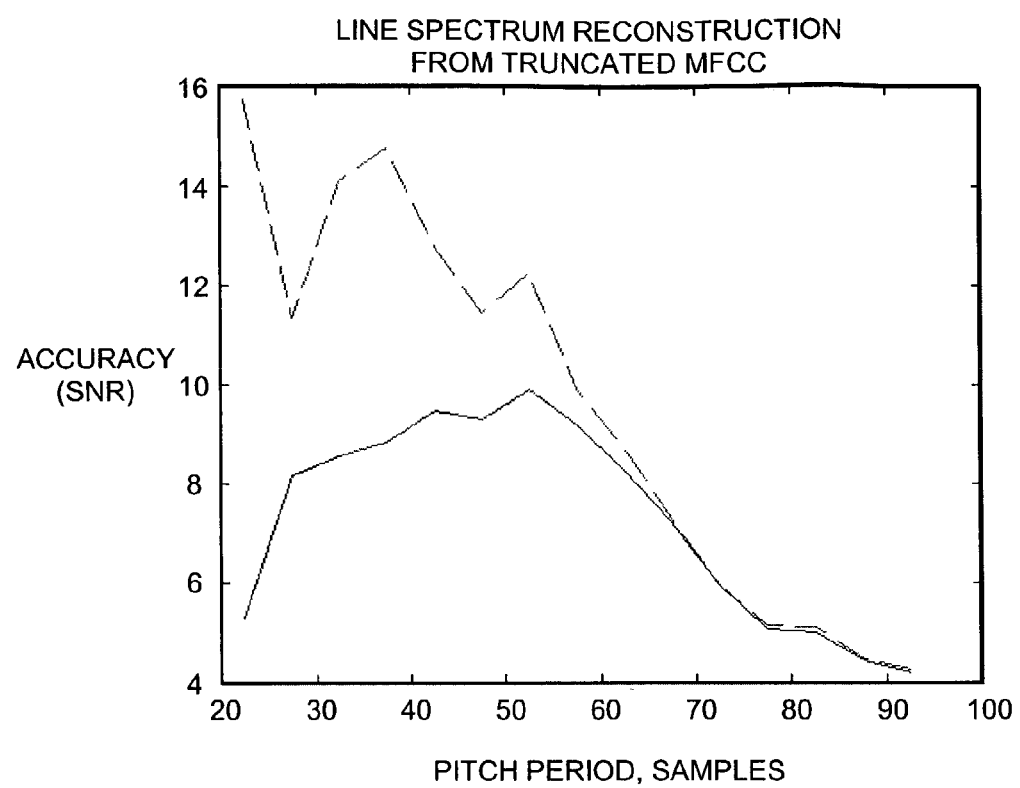
FIG. 5 is a simplified graphical illustration showing improved speech reconstruction accuracy attributable to MFCC vector HOC estimation of the present invention.

Reference is now made to FIG. 5, which is a simplified graphical illustration showing improved speech reconstruction accuracy attributable to MFCC vector HOC estimation of the present invention. FIG. 5 presents the results of the application of the present invention to a real speech signal in which recorded speech data was used containing multiple utterances produced by a number of male and female speakers. The number of voiced frames used for the evaluation exceeds 4,000. Reference harmonic amplitudes were obtained directly from STFT of each voiced frame using precise pitch values. MFCC vectors were computed using an ETSI ES 201 108 standard front-end. The reconstruction accuracy was measured by linear signal-to-noise ratio (SNR). Average accuracy as a function of pitch period length is shown, where the solid line corresponds to the reconstruction from truncated MFCC vectors, while the dashed curve corresponds to the reconstruction from the MFCC vectors as performed by the present invention.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for estimating high-order Mel Frequency Cepstral Coefficients, the method comprising:
    a) in an MFCC vector of length N having L low-order coefficients (LOC), initializing any of N−L high-order coefficients (HOC) of said MFCC vector to a predetermined value, thereby forming a candidate MFCC vector;
    b) synthesizing a speech signal frame from said candidate MFCC vector and a pitch value using a harmonic model of voiced speech for parametric representation of said speech frame;
    c) computing an N-dimensional MFCC vector from said synthesized frame, thereby producing an output MFCC vector;
    d) performing said steps b)-c) up to a predetermined number of additional iterations, wherein the HOC of said output MFCC vector of a given iteration is appended to said LOC to form a new candidate MFCC vector for the next iteration; and
    e) estimating for each of a plurality of iterations of steps b)-c) any of the parameters of said model from said candidate MFCC vector and said pitch value for said iteration.

2. A method according to claim 1 wherein said computing step comprises calculating using a harmonic model of voiced speech for parametric representation of said speech frame, wherein at each of a plurality of iterations of steps b)-c) said output MFCC vector is computed from said harmonic model parameters estimated at that iteration.

3. A method for estimating high-order Mel Frequency Cepstral Coefficients, the method comprising:
    a) convening a truncated L-dimensional MFCC vector of low-order coefficients (LOC) to an N-dimensional binned spectrum;
    b) initializing N−L high-order coefficients (HOC) using predetermined values;
    c) computing an N-dimensional binned spectrum corresponding to said HOC;
    d) calculating a composite binned spectrum from both of said binned spectra using coordinate-wise multiplication;
    e) estimating at least one harmonic model parameter from said composite binned spectrum and a pitch frequency, thereby producing a basis bins matrix and basis function mixing coefficients;
    f) synthesizing a new binned spectrum by multiplying said basis bins matrix by the vector of said basis function mixing coefficients;
    g) regularizing said synthesized bins; and
    h) convening said regularized synthesized bins to HOC, thereby estimating said HOC.

4. A method according to claim 3 wherein said convening step a) comprises converting using an N-dimensional Inverse Discrete Cosine Transform (IDCT) followed by an antilog operation.

5. A method according to claim 4 wherein said converting step a) comprises appending to said truncated MFCC vector an N−L-dimensional vector of zero-valued coordinates.

6. A method according to claim 3 wherein said initializing step b) comprises initializing using zero values, and wherein each coordinate of said binned spectrum vector corresponding to said HOC is set equal to 1.

7. A method according to claim 3 wherein said initializing step b) comprises:
    preparing a set of HOC vectors, wherein each vector corresponds to a predetermined range of pitch values;

determining the range into which a provided pitch value fits;
selecting from among said HOC vectors a vector that corresponds to said range; and
initializing said HOC with said selected vector.

8. A method according to claim 3 wherein said computing step c) comprises logically preceding said initialized HOC vector by N−L zeros.

9. A method according to claim 3 wherein said estimating step e) comprises modeling at least one harmonic amplitude $A_k$ as a linear combination of N basis functions $\{BF_i\}$ sampled at a plurality of pitch frequency multiples as $A_k = \sum_{i=1}^{N} b_i \cdot BF_i(kF_p)$.

10. A method according to claim 3 and further comprising performing a transformation $\sqrt{B_i \cdot S_i}$ of each coordinate $B_i$ of said composite binned spectrum, wherein $S_i$ is a sum of the values of the $i^{th}$ Mel-filter, where said input LOC was produced using a Power Short Time Spectrum.

11. A method according to claim 3 wherein said regularizing step g) comprises:
identifying any coordinates of said synthetic vector whose value does not exceed a predefined threshold; and
setting any of said identified coordinates equal to a regularization value $R=a \cdot B_{av}$, wherein $B_{av}$ is an average of the coordinate values of said synthetic vector and a is predefined value.

12. A method according to claim 3 wherein said converting step h) comprises:
applying a logarithm to synthetic vector; and
performing a Discrete Cosine Transform on said synthetic vector.

13. A method according to claim 3 and further comprising:
i) computing a new binned spectrum corresponding to said HOC vector; and
j) performing steps d)-h) using said new binned spectrum corresponding to said HOC vector.

14. A method according to claim 13 and further comprising:
performing steps i)-j) a plurality of times until a predefined number of iterations is reached; and
if said predefined number of iterations has been reached, concatenating said estimated HOC with said LOC.

15. A method according to claim 3 wherein said estimating step e) comprises:
sampling a plurality of basis functions at a plurality of pitch frequency multiples;
calculating a spectral envelope for each sampled basis function by convolution with a Fourier transform of a windowing function;
applying Mel filters to each of said spectral envelopes, resulting in an N-dimensional basis bins vector $BB_1$;
composing an N by N basis bins matrix BB having said basis bins vectors $BB_i$ as its columns;
computing an equation matrix Q as $Q=BB^T*BB+\epsilon*I$ where I is a unit matrix and $\epsilon$ is a regularization factor;
applying LU-decomposition to said equation matrix Q;
computing an equation right side vector V as $V BB^T*B$, where B is a column vector of bin value inputs to harmonic model parameter estimation; and solving a matrix equation $Q*b=V$ in b using the LU representation of said equation matrix Q.

16. A method according to claim 15 wherein said computing an equation matrix step comprises computing said regularization factor as 0.001 multiplied by the average of the $BB^T*BB$ matrix elements residing at the main diagonal.

17. A Distributed Speech Recognition system employing MFCC vector HOC estimation, the system comprising:
speech recognition front-end apparatus operative to extract from each frame of an input speech signal a LOC, a pitch value, and a voicing class;
HOC restoration apparatus operative to:
form a candidate MFCC vector from said LOC and a plurality of HOC,
synthesize a speech signal frame from said candidate MFCC vector and said pitch value,
apply speech recognition front-end processing to said synthesized frame, thereby producing an output MFCC vector, and
sample basis functions at a plurality of pitch frequencies and compute a plurality of mixing coefficients;
speech recognition back-end apparatus operative to produce text from a plurality of said output MFCC vectors;
speech reconstruction apparatus operative to synthesize speech from plurality of said output MFCC vectors, said pitch values, and said voicing class values; and
harmonic amplitudes modeling apparatus operative to calculate harmonic amplitudes from said basis functions and mixing coefficients,
wherein said speech reconstruction apparatus is operative to synthesize said speech from a plurality of said output MFCC vectors, said pitch values, said voicing class values, and said harmonic amplitudes.

18. A computer program embodied on a computer-readable medium, the computer program comprising:
a) a first code segment operative for an MFCC vector of length N having L low-order coefficients (LOC) to initialize any of N−L high-order coefficients (HOC) of said MFCC vector to a predetermined value, thereby forming a candidate MFCC vector;
b) a second code segment operative to synthesize a speech signal frame from said candidate MFCC vector and a pitch value using a harmonic model of voiced speech for parametric representation of said speech frame;
c) a third code segment operative to compute an N-dimensional MFCC vector from said synthesized frame, thereby producing an output MFCC vector;
d) a fourth code segment operative to execute said second and third code segments up to a predetermined number of iterations, wherein the HOC of said output MFCC vector of a given iteration is appended to said LOC to form a new candidate MFCC vector for the next iteration; and
e) a fifth code segment operative to estimate for each of a plurality of said iterations any of the parameters of said model from said candidate MFCC vector and said pitch value for said iteration.

19. A computer program embodied on a computer-readable medium, the computer program comprising:
a first code segment operative to convert a truncated L-dimensional MFCC vector of low-order coefficients (LOC) to an N-dimensional binned spectrum;
a second code segment operative to initialize N−L high-order coefficients (HOC) using predetermined values;

a third code segment operative to compute an N-dimensional binned spectrum corresponding to said HOC;

a fourth code segment operative to calculate a composite binned spectrum from both of said binned spectra using coordinate-wise multiplication;

a fifth code segment operative to estimate at least one harmonic model parameter from said composite binned spectrum and a pitch frequency, thereby producing a basis bins matrix and basis function mixing coefficients;

a sixth code segment operative to synthesize a new binned spectrum by multiplying said basis bins matrix by the vector of said basis function mixing coefficients;

a seventh code segment operative to regularize said synthesized bins; and a eighth code segment operative to convert said regularized synthesized bins to HOC, thereby estimating said HOC.

* * * * *